United States Patent
König

(10) Patent No.: US 6,241,374 B1
(45) Date of Patent: Jun. 5, 2001

(54) APPARATUS FOR KNEADING DOUGH INTO ROUND PIECES

(76) Inventor: Elisabeth König, Ursprungweg 70-72, Graz (AT), A-8045

( * ) Notice: Subject to any disclaimer, the term of this patent is extended or adjusted under 35 U.S.C. 154(b) by 0 days.

(21) Appl. No.: 09/446,759

(22) PCT Filed: Jun. 23, 1998

(86) PCT No.: PCT/AT98/00158

§ 371 Date: Dec. 22, 1999

§ 102(e) Date: Dec. 22, 1999

(87) PCT Pub. No.: WO99/01037

PCT Pub. Date: Jan. 14, 1999

(30) Foreign Application Priority Data

Jun. 30, 1997 (AT) ...................................................... 1119/97

(51) Int. Cl.[7] .................. A21C 1/14; A21C 7/01
(52) U.S. Cl. ............................................. 366/69; 425/238
(58) Field of Search .................................. 366/69, 71, 72, 366/74, 76.8, 77, 92–94; 425/206, 238, 241; 99/348

(56) References Cited

U.S. PATENT DOCUMENTS

| | | | |
|---|---|---|---|
| 3,049,084 | * | 8/1962 | Knecht et al. . |
| 3,125,039 | * | 3/1964 | Haug et al. . |
| 4,869,661 | * | 9/1989 | Nogueroles ............................. 366/69 |
| 5,007,820 | * | 4/1991 | Schwab et al. . |
| 5,242,698 | * | 9/1993 | Knost et al. . |
| 5,330,344 | * | 7/1994 | Konig . |
| 5,775,804 | * | 7/1998 | Meier .................................. 366/76.8 |

FOREIGN PATENT DOCUMENTS

| | | |
|---|---|---|
| 363 411 | 8/1981 | (AT) . |
| 639 896 | 12/1936 | (DE) . |
| 2 479 661 | 10/1981 | (FR) . |

\* cited by examiner

Primary Examiner—Charles E. Cooley
(74) Attorney, Agent, or Firm—Salter & Michaelson

(57) ABSTRACT

An apparatus for kneading dough into round pieces is provided. The apparatus includes an inner drum disposed within an outer drum. The inner drum includes an outer periphery on which deepenings are disposed. The deepenings are assigned to the openings of the outer drum. The apparatus also includes a first drive for driving the inner drum in relation to the outer drum such that the deepenings of the inner drum execute a kneading movement in relation to the openings of the outer drum. A support is guided along at least a section of the periphery of the lower half of the outer drum. The support includes a plurality of links interconnected to form an endless chain. The support is spaced apart from at least a portion of the periphery of the outer drum and forms a closed substantially flat surface facing the outer drum. A second drive is included for driving the endless chain such that the plurality of links follow the rotation of the outer drum.

10 Claims, 2 Drawing Sheets

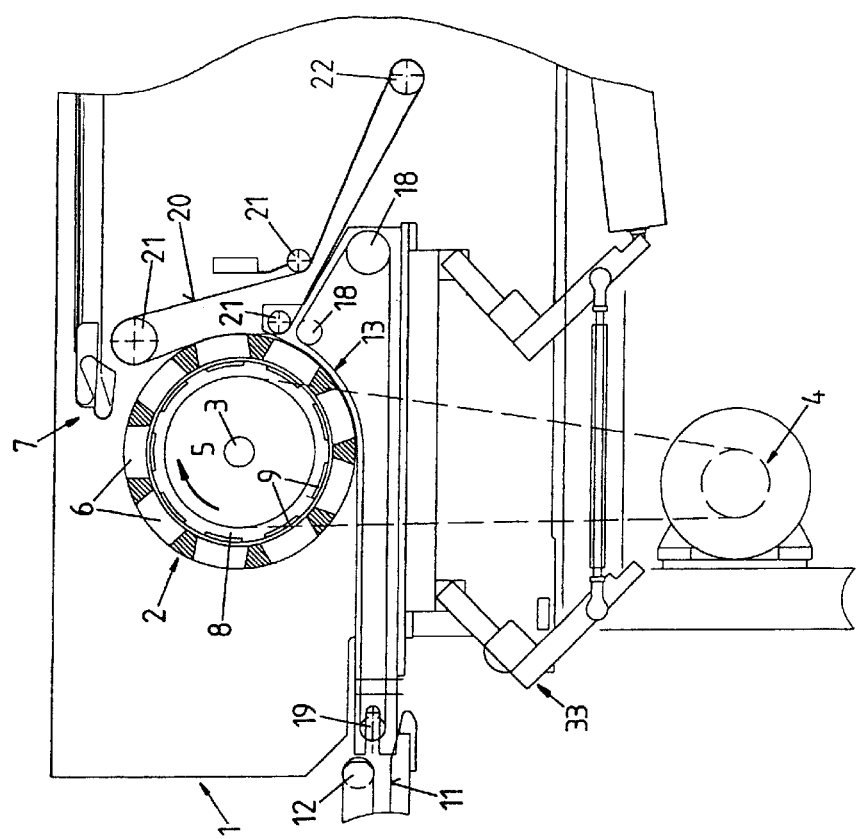
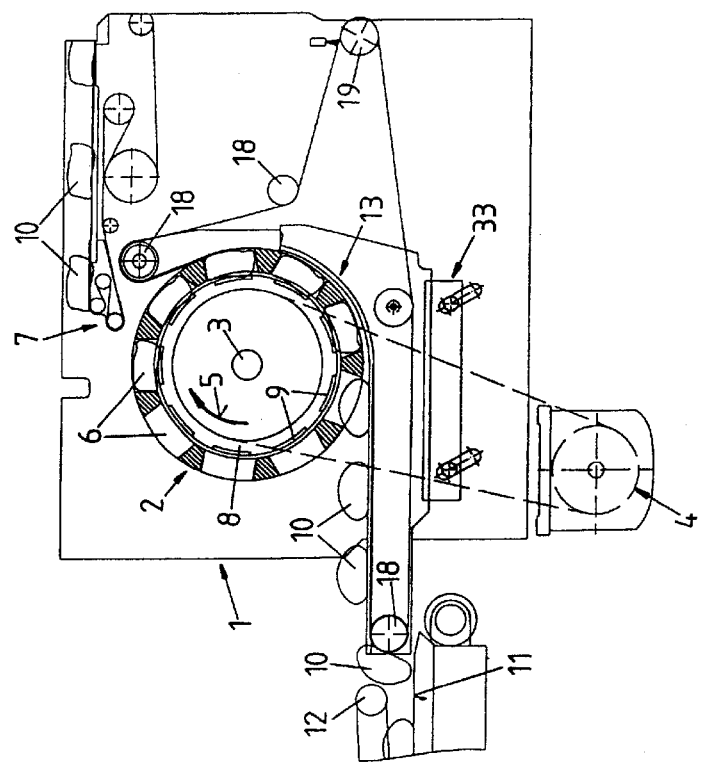
Fig. 1
Fig. 2

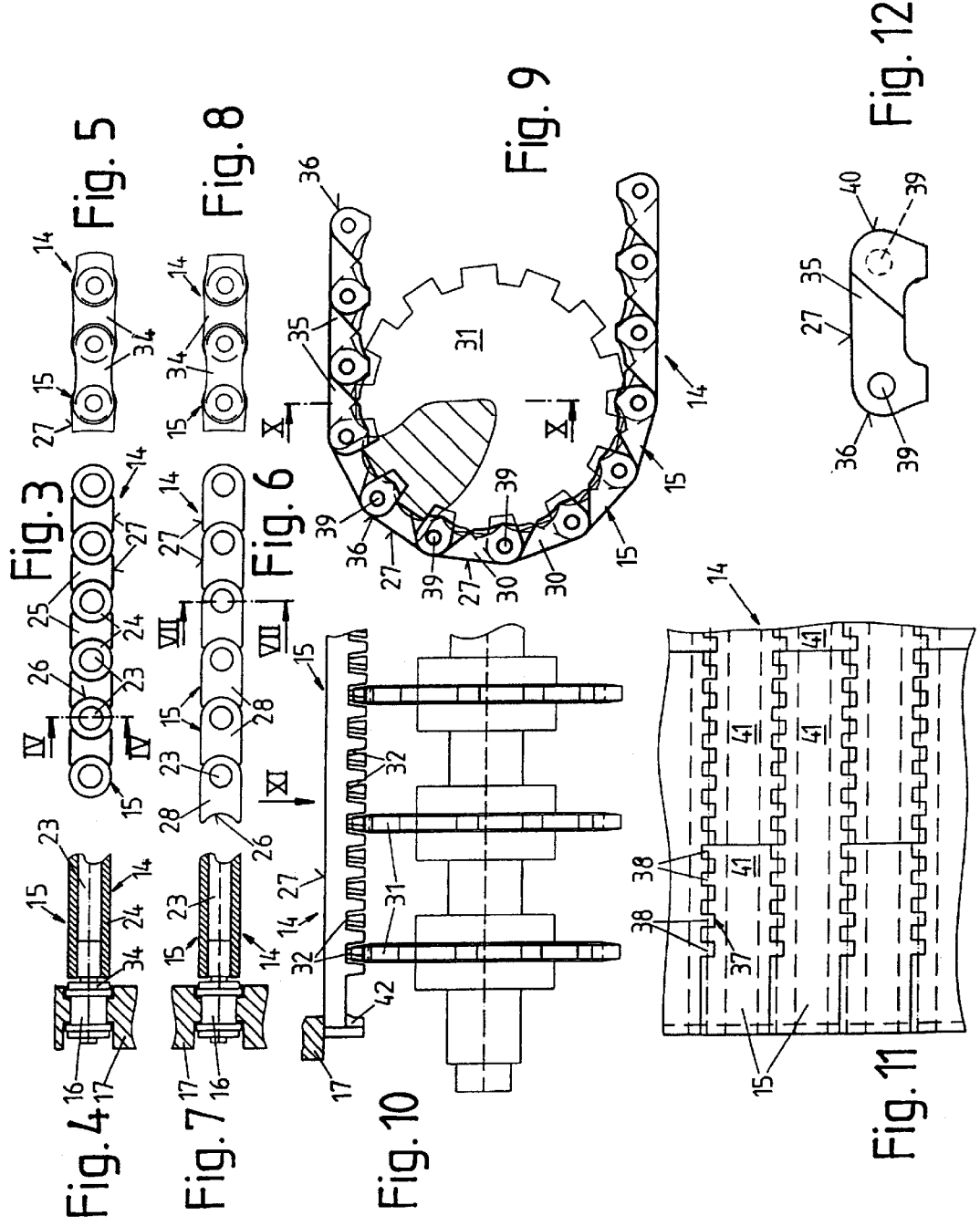

APPARATUS FOR KNEADING DOUGH INTO ROUND PIECES

BACKGROUND

1. Field of the Invention

The present application is related to an apparatus for kneading dough and, in particular, to an apparatus for kneading dough into round pieces.

2. Related Art

Such apparatus for round kneading are known. When round kneading of dough pieces, it is further known to use instead of the inner drum provided with deepenings a kneading tool disposed at the summit region of that drum that has receiving openings for the dough pieces, which tool is driven for kneading movement and mostly consists of a kneading plate provided with recesses.

The kneading movement may—as it is known—be performed in different manners: mostly the kneading tool (the above mentioned inner drum or the kneading plate) executes a circular, elliptic or spiral movement in relation to the openings of the drum receiving the dough pieces, by which movement the dough piece disposed within the opening of the drum gets a spherical or ball-like shape. In case of a spiral movement, this movement at its start has small amplitudes which increase by and by.

Within a known apparatus, the members interconnected to a chain are formed by rounded rods, and an endless band covers this rod chain and improves supporting of the dough pieces disposed within the receiving opening of the drum. It is further known, to replace this band by textile hoses disposed under tension over always three supporting rods. These apparatus, in general, have been shown to be sufficient, but have disadvantages when dealing with very weak and sensitive doughs, that is, doughs for making doughnuts, brioches, hamburgers, and the like. Such doughs, in general, are characterized either by very high dough results or by additions of particular ingredients, as sugar, fat, eggs, and the like. Baker's ware produced therewith is subject to high demands for a smooth, clean strip-free surface, and this surface quality, of course, must be already present on the ready kneaded dough pieces.

It has been shown that the described known apparatus do not fully satisfy when producings such baker's ware. A band put over an endless chain of supporting rods is stretched and compressed during its movement at the points of deflection of the endless band chain, because the band is not disposed within the neutral middle zone of the guiding chain driving it. This leads to continuous band stresses and, therefore, to a high wear of the band, and, at the input and output locations, to a corresponding stressing of the dough pieces by the stretching or compressing. Replacing the endless band by textile hoses tightened over individual rods has also not shown to be sufficient, because there is no more a homogeneous, closed surface for supporting the dough pieces. Further, there results an additional open zone in the region of deflections of the supporting rod chain, so that the dough piece is pinched. This is observed also when a kneading band is disposed in front of this deflection region.

It would be indeed possible, to guide an endless band within the neutral zone, however, the effort for this is considerable.

The invention has at its object to improve the support of the dough pieces at the member chain with little effort so that the aforesaid markings of the member chain on the dough pieces and on the baker's ware produced therefrom are avoided. The invention solves this task by the features that the links and, if desired, filler pieces disposed between them, constitute a closed surface at the side facing the drum, which surface is substantially flat, when the support means is in its stretched condition. This closed planar surface constitutes a supporting surface for the dough pieces to be supported, that is practically gap-less and free of kneading recesses, which supporting surface avoids markings at the dough pieces produced by such gaps or recesses. For this, within the spirit of the invention, there exist a plurality of preferred embodiments. On the one hand, the construction according to the invention can be so chosen that each filler piece is constituted by a rod-shaped member different from the links and being held by two neighboring links by positive locking. This results in a construction having very low costs, because these filler rods, for example, of plastics material, can be produced in a simple manner. Further, this construction shows a very high stability and a high self-cleaning effect that, can be still improved by providing each filler piece with a cross section that is delimited by two opposing circular bow sections and a straight line interconnecting them, wherein the filler piece with its cylindric surfaces constituted by the circular bow sections contacts the periphery of the links having a circular cross section, the planar surface constituted by the straight line facing the drum. Self-cleaning occurs mainly at the points of deflection of the endless link chain by the rotational movements of the links in relation to the filler pieces.

Another preferred embodiment consists in that the cross section of each link has a protrusion directed towards the neighboring link and contacting this link to form a closed surface. With respect to the gap-free supporting of the dough pieces without that strips or the like are marked on the dough pieces, this construction is equivalent to the variant described earlier, however, when seen from the standpoint of manufacture, it requires somewhat more effort, because the single links must show a molded part of synthetic plastics material over a metallic core, in order to obtain a dough-rejecting surface. When seen from the standpoint of self-cleaning the first named variant is also better, even if a particular favorable construction is given in which the cross section of the protrusion is delimited on its side facing the neighboring link concavely by an arc of a circle and engages with this side in a two-dimensional manner the neighboring link having a cross section shaped along an arc of a circle, the concavely delimited cross section verging into a planar area facing the drum.

Lastly, there is also the possibility to design the construction that the links are interconnected to a link chain by axes, which axes are spaced apart from each other, the links having protrusions bridging these spaces, which protrusions constitute the closed surface on their side facing the drum. Also this construction meets the requirements for supporting the dough pieces, however, when seen from the standpoint of the danger of contamination, it is less favorable than the two first named variants.

BRIEF DESCRIPTION OF THE DRAWINGS

In the drawings, exemplary embodiments of the invention are schematically shown.

FIG. 1 shows the substantial elements of an inventive apparatus for round kneading of dough pieces, in a vertical section.

FIG. 2 shows, also in a vertical section, a different embodiment.

FIG. 3 shows in an enlarged scale a section of the link chain.

FIG. 4 is a section along the line IV—IV of FIG. 3.

FIG. 5 shows the connection of single elements to a link chain in a side view.

FIG. 6 shows a variant to FIG. 3.

FIG. 7 is a section along the line VII—VII of FIG. 6.

FIG. 8 shows a view similar to that of FIG. 5.

FIG. 9 shows a further embodiment in a side view, partially in section.

FIG. 10 is a section along the line X—X of FIG. 9.

FIG. 11 is a top view of FIG. 10 in direction of the arrow XI of FIG. 10.

FIG. 12 shows a detail in side view.

DETAILED DESCRIPTION OF THE PREFERRED EMBODIMENTS

Within the embodiment of FIGS. 1 and 2, the machine shown there has a frame work 1, in which a drum 2 is bearingly supported for rotation around a horizontal axis 3. The drum 2 is driven for stepwise or continuous rotation around horizontal axis 3 in the sense of the arrow 5 by a drive means, not shown. The drum 2 has a plurality of openings 6, suitably arranged in rows extending in parallel to the axis 3, in which openings the dough pieces 10 to be kneaded are put in by delivery means 7. This delivery means 7 receives the dough pieces from a portioning apparatus, not shown. Within the drum 2 there is bearingly supported an inner drum 8 concentrically with regard to the drum 2, which inner drum 8 is provided with deepenings 9 on its outer periphery for kneading the dough pieces and is driven for movement by means of a drive means 4 in addition to its rotation around the axis 3 so that the deepenings 9 execute a circular, elliptic or spirally-shaped movement relative to the openings 6.

Dough pieces 10 are placed on rest 11, which may be an endless band, a spreading belt, and the like. A roller 12 may be provided above the rest 11 which assists the deposition and, in addition, is used for adjusting the correct seam position. In order to avoid that the dough pieces 10 can fall out of the openings 6, when moving the drum, in particular in the lower half of the drum 2, a support means 13 is provided within the apparatus according to FIGS. 1 and 2 in the right and lower portion of the periphery of the drum 2, which support follows the periphery of the drum 2. The main object of this support 13, however, is to constitute a bottom of the kneading chamber formed by the openinings 6 when kneading the dough pieces 10. This support means 13 is formed by an endless chain 14, the single links 15 (FIG. 3, 4) thereof have a circular cross section and are guided on their two ends by means of rollers 16 on lateral guide means 17, so that the link chain 14 follows the periphery of the drum, however, is kept in a small distance therefrom, in particular in the lower peripheral region of the drum 2 in order to ensure a space for the dough piece 10 which becomes a ball-shaped or nearly spherical shape when being kneaded. This spacing suitably is variable by an adjustment means 33, by which the guide means for the link chain 14 can be so displaced that the gap between it and the periphery of the drum 2 can be adjusted to the desired size everywhere. Thereby also the kneading pressure can be adjusted. As a rule, this gap is so adjusted that it is greater in the lower region of the drum 2 or in the deposition section of the dough pieces 10 than in that region in which the kneading process starts. The link chain 14 is conducted over deflection rollers 18, one of which being driven in order to ensure the necessary circulation of the link chain 14. The necessary tension of the link chain 14 is made by a tensioning roller 19. In the region of the lower summit of the drum 2, the dough pieces 10 fall out of the openings 6 and onto the link chain 14 and are conveyed from it in direction towards the rest 11, where at the place of the deflection roller 18 (FIG. 1) or of the tensioning roller 19 (FIG. 2) neighboring the rest 11, the dough pieces 10 are released onto the rest 11.

Within the embodiment according to FIG. 2, the endless link chain 14 of the support means 13 is provided only in the lower region of the drum 2. Following the location at which the dough pieces are introduced by the delivery means 7 into the openings 6 of the drum 2, a kneading band 20 is positioned near the support means 13, which band contacts the periphery of the drum 2 and constitutes the bottom for the kneading chambers formed by the openings 6 during the kneading process, so that the kneading pressure is supported. This kneading band 20 is conducted by deflection rollers 21 and tensioned by a tension roller 22.

An exemplary embodiment of a rod chain 14 is shown in FIGS. 3, 4 and 5 more in detail. Each link 15 is in the shape of a rod and has a metallic core constituting the axis 23, at the end of which the rollers 16 are disposed. This axis 23 is surrounded by a jacket 24 of synthetic plastics material, suitably of dough-rejecting material. Instead of this, each member 15 may consist of a tube of rust-proof material (NIROSTA™ or the like), what is favorabe by weight reasons. Between the single links 15, filler pieces 25 are disposed which together with surface portions of the members 15 constitutes a substantially closed surface at the side of the link chain 14 facing the drum 2, that is a surface which is substantially free of gaps. For this, the single links 15 are spaced from each other, each spacing being filled by a filler piece 25, whereby the filler pieces 15 at their ends are connected to endless link chain 14 by plates 34 (FIG. 5). The filler pieces 25 are positively interlocked by the links 15 and suitably are also held in position laterally or at their ends by the plates 34, so that the filler pieces 25 must not be particularly guided by the guide means 17. For this, each filler piece 25 has a cross section that at the sides facing the two rods 15 is delimited by circular bow sections 26 so that the filler piece 25 is in a surface engagement with the two neighboring cylindrical surfaces of the rods 15. The two circular bow sections 26 of the cross section of the filler piece 25 are connected by straight lines at their two ends so that planar surfaces 27 are built up between the two circular cylinder surfaces constituted by the circular bow section 26. The flat surfaces 27 facing the drum 2 constitute together with the peripheral sections of the links 15 disposed between them the closed surface which, when the chain is in a stretched condition (FIG. 3), is substantially even. At the places, where the chain 14 is deflected, that is in the region of the deflection pulleys 18, there arise no gaps between the members 15 and the filler pieces 25, because the circular cylindrical surfaces formed by the circular bow sections 26 are only guidingly displaced along the cross cylindrical periphery of the members 15, but do not open gaps. The displacement also results in a self-cleaning of the chain 14 from adhering dough residues.

An embodiment variant of the chain 14 is shown in FIGS. 6 to 8. Within this embodiment, the cross section of each link 15 has a protrusion 28 directed towards the neighboring member 15, which protrusion engages the neighboring link and constitutes a closed surface with this link at that side of the chain 14 that faces the drum 2. The axis 23 of each link 15, therefore, is surrounded by a unitary body of synthetic plastics material, the cross section of which at the side facing the neighboring member 15 is formed in an analogous member by a circular bow section 26, as this is shown in FIG. 3. At least at the side facing the drum 2, the circular bow-shaped cross section 26 of the protrusion 28 changes into a planar surface 27, so that there results a closed, gap-free surface at that side of the chain 14 which faces the drum 2, and this also at the places of deflection of the chain 14. Also within this embodiment, the several members 15 are interconnected by plates 34 to a chain. Also within this embodiment, there occurs a self-cleaning effect of the single members of the cain 14.

Within the embodiment according to FIGS. 10 to 12 the chain 14 is formed by a link chain in the manner of a creeper band. Also within this construction the several members 15 are interconnected to an endless chain having hinge points like a link chain. The individual link places 29 are spaced apart from each other and the individual links 15 have protrusions 30 bridging these spacings, similar to the protrusions 28 of the embodiment according to FIGS. 6 to 8, however, having a different shape. This protrusion 30 gives the body of the respective member 15 a plate-like shape having a planar surface 27 at the side of the link chain facing the drum 2. That side of the plate-shaped body member that faces the neighboring member 15, changes—when seen in cross section—to a point 35 (FIG. 9, 12) which engages a circular-cylindrically shaped surface portion 36 of the respective neighboring member 15. Thereby results a closed, gap-free surface supporting the dough pieces (FIG. 9) also at the locations where the chain 14 is deflected. The connection of the individual members 15 to a chain 14 is here not made by plates, but by interconnecting adjacent members 15 in the manner of a hinge 37 (FIG. 11). For this, the individual members 15 have protrusions at the edges facing each other, which protrusions interlock in the manner of teeth 38. These teeth 38 are intersected by rounded rods 39 of synthetic plastics material which constitute the axes of the hinges 37. In order to obtain the closed surface also at the points of deflection of the chain 14, the teeth 38 have rounded surfaces 40 (FIG. 12) at their side facing the drum 2, the center of these roundings coincides with the center of the respective axes (rounded rod 39).

In order to facilitate manufacture of the individual members 15, each member 15 is subdivided in direction of the axis 3 of the drum 2, therefore in direction of its length, into several sections 41, as this is shown in FIG. 11. Connection is made by the rounded rods 39 which are secured against pulling out of the links 37 by flanges 42 (FIG. 10) at the edges of the outermost sections 41.

Such a link chain can be driven in a similar manner as the endless chains 14 of the embodiments according to FIGS. 3 to 8, that is by driving at least one of the deflection rollers 18. Whereas within the embodiments according to FIGS. 3 to 8 the individual links 15 are guided along the guide means 17 by means of the rollers 16 and a deflection roller serves as a drive element, the force being introduced via the rollers 16, within the embodiment according to FIGS. 9 to 12, however, the single links 15 must not be laterally guided in guide means 17. Instead of this, guidance is made by chain wheels 31 (FIG. 8) at the deflection rollers 18. These chain wheels 31 intermesh with recesses 32 at that side of the links 15 which is opposed to the drum 2 and, thereby, on the one hand drive the chain 14, on the other hand they serve for a lateral guidance of the single links 15. The guide means 17 keeps the link chain 15 in the desired distance from the drum 2.

What is claimed is:

1. An apparatus for kneading dough into round pieces, comprising:

a first drum having openings for receiving the dough pieces to be kneaded, wherein kneading of the dough pieces is performed by means of a second, inner drum that is disposed inside the first drum, the inner drum including an outer periphery and executing a kneading movement in relation to the first drum, the inner drum further including deepenings disposed on the outer periphery assigned to the openings of the drum, and wherein the first drum includes a lower half and is accompanied at least in a section of the lower half by a support means guided along the periphery and having a plurality of links interconnected to form a chain, which links are elongated in direction of an axis of the drum and support the dough pieces within the openings of the drum when being kneaded and follow the rotation of the drum, the links being spaced apart from the drum by a distance at least along a section of the periphery of the drum wherein the links constitute a closed surface at the side facing the drum, which surface is substantially flat, when the support means is in its stretched condition.

2. The apparatus of claim 1, wherein each filler piece is formed by a rod-shaped member different from the links and being held by two neighboring links by positive locking.

3. The apparatus of claim 2, wherein each filler piece has a cross section delimited by two opposing circular bow sections and a straight line connecting them, wherein the filler piece with its cylindric surfaces constituted by the circular bow sections contacts the periphery of the links having a circular cross section, and wherein a planar surface constituted by the straight line faces the drum.

4. The apparatus of claim 1, wherein the cross-section of each link has a protrusion directed towards the neighboring link and engaging this link to form the closed surface.

5. The apparatus of claim 4, wherein the cross section of the protrusion is delimited on its side facing the neighboring link concavely by an arc of a circle and engages with this side in a two-dimensional manner the neighboring link having a cross section shaped along an arc of a circle, the concavely delimited cross section verging into a planar area facing the drum.

6. The apparatus of claim 1, wherein the links are interconnected to a link chain by axes spaced apart from each other, wherein the links have protrusions bridging this spacing to form the closed surface at their side facing the drum.

7. The apparatus of claim 6, wherein adjacent links are interconnected in the manner of a hinge, the axes intersect teeth of the links, said teeth having circular cylindric rounded surfaces at their side facing the drum, wherein the center of these roundings coincides with the center of the respective axes.

8. The apparatus of claim 1, further comprising at least one kneading band guided along a section of the periphery of the outer drum, such that the kneading takes place in cooperation with the deepenings.

9. The apparatus of claim 1, wherein the distance is adjustable.

10. The apparatus of claim 1, further comprising filler pieces disposed between the links such that the links and the filler pieces form the closed and substantially flat surface of the support means when the support means is in a stretched condition.

* * * * *

UNITED STATES PATENT AND TRADEMARK OFFICE
CERTIFICATE OF CORRECTION

PATENT NO. : 6,241,374 B1 Page 1 of 1
DATED : June 5, 2001
INVENTOR(S) : Elisabeth König It is certified that error appears in the above-identified patent and that said Letters Patent is hereby corrected as shown below:

<u>Column 6,</u>
Line 22, replace "The apparatus of claim 1" with -- The apparatus of claim 10 --.

Signed and Sealed this

Tenth Day of September, 2002

*Attest:*

*Attesting Officer*

JAMES E. ROGAN
*Director of the United States Patent and Trademark Office*